United States Patent
Grahame

[11] 3,840,787
[45] Oct. 8, 1974

[54] WOUND CAPACITOR WITH INTERNAL DISCHARGE RESISTOR

[75] Inventor: Frederick W. Grahame, Glens Falls, N.Y.

[73] Assignee: General Electric Company, New York, N.Y.

[22] Filed: Jan. 23, 1974

[21] Appl. No.: 435,692

[52] U.S. Cl.................. 317/256, 317/74, 317/243
[51] Int. Cl............................................. H01g 1/11
[58] Field of Search.................... 317/243, 256, 74

[56] References Cited
UNITED STATES PATENTS
| | | | |
|---|---|---|---|
| 1,563,754 | 12/1925 | Latour | 317/256 X |
| 1,775,266 | 9/1930 | Bailey | 317/256 X |
| 3,302,081 | 1/1967 | Grahame | 317/256 |

FOREIGN PATENTS OR APPLICATIONS
| | | | |
|---|---|---|---|
| 1,186,644 | 4/1970 | Great Britain | 317/256 |

Primary Examiner—E. A. Goldberg

[57] ABSTRACT

An internal discharge resistor comprises an electrically resistive material strip which is placed near the end of a capacitor roll section. One of the roll electrode strips is shorter than the other at the roll end and the resistor strip overlies the shorter electrode and, extends longitudinally in the roll and over an exposed edge of the intermediate dielectric material to make contact with the other electrode. The resistor also functions to dissipate heat within the capacitor.

10 Claims, 4 Drawing Figures

PATENTED OCT 8 1974 3,840,787
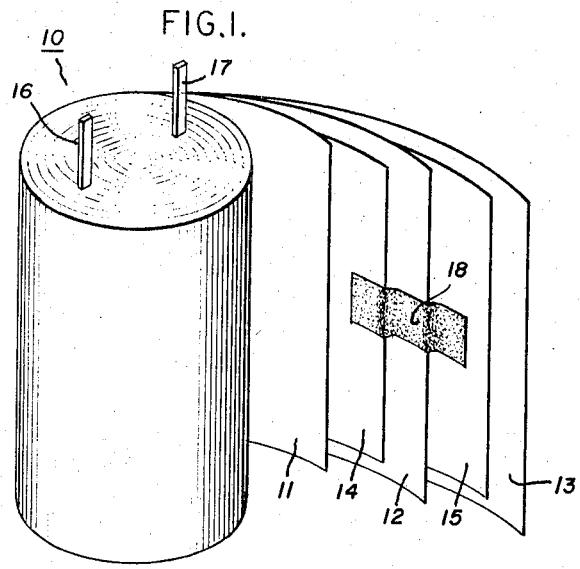
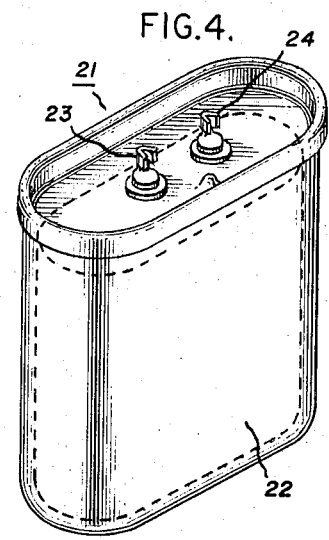
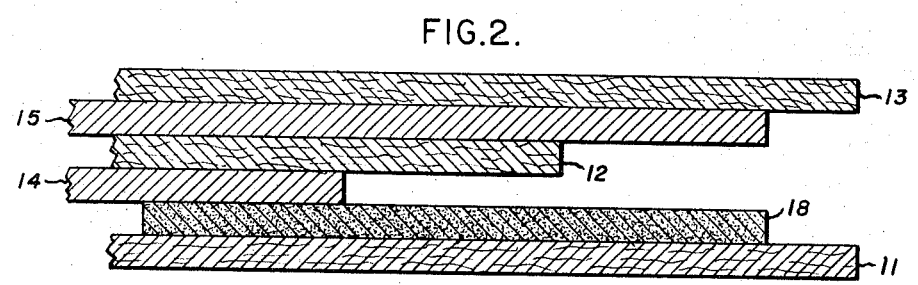
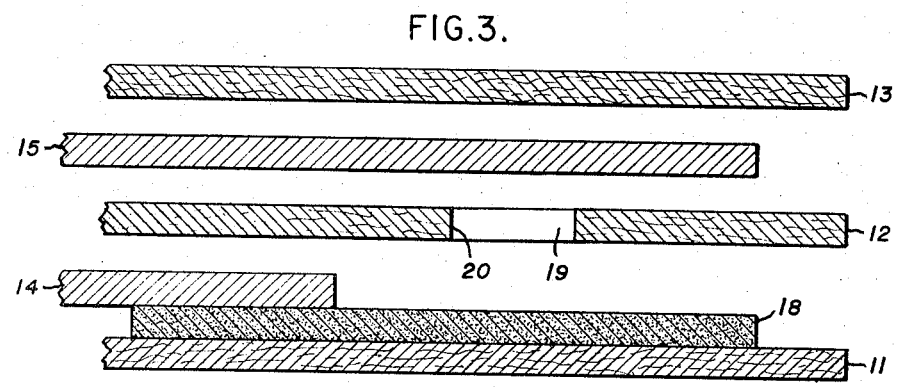

WOUND CAPACITOR WITH INTERNAL DISCHARGE RESISTOR

BACKGROUND OF THE INVENTION

This invention relates to a capacitor assembly with an improved discharge resistor in the form of a high resistance shunt, and more particularly to a roll capacitor wherein a thin electrically conducting strip of a predetermined resistance engages and interconnects the capacitor electrodes to discharge the capacitor within a predetermined period of time after de-energization thereof.

The use of discharge resistors to dissipate an undesirable voltage between capacitor terminals, or between capacitor electrodes, is known in the art. For example, U.S. Pat. No. 3,302,081 Grahame, assigned to the same assignee as the present invention, utilizes a predetermined resistivity strip which engages the capacitor terminals within a capacitor casing. Typically, the undesirable voltage which is to be dissipated may be the residual voltage remaining when an external power source is removed from the capacitor, or may be excessive voltage resulting from a sudden surge of power through the capacitor. In any event, the undesirable voltage may be dissipated by a suitable resistive element which is electrically connected between the electrodes of a capacitor. The discharge resistor discharges the undesirable voltage in a shorter period of time than would otherwise be necessary without a discharge resistor.

It has been a practice to connect suitable external discharge resistors across the terminals of a capacitor, or between a suitable terminal and the corresponding ground but this is both uneconomical and requires additional manufacturing steps. Furthermore, the external resistor is subject to damage during assembly and use because of its exposure. As noted in the foregoing patent, discharge resistors are also incorporated within the capacitor casing of smaller capacitors in the form of a conductive strip interconnecting the electrodes. However, in most instances, this kind of resistor usually requires holes in the foil or dielectric or folds in the resistor, all of which make it extremely difficult to expenditiously insert discharge resistors during high speed capacitor roll winding production processes.

SUMMARY OF THE INVENTION

Accordingly it is an object of this invention to provide a roll capacitor incorporating an improved discharge resistor.

It is a further object of this invention to provide an improved roll capacitor with a high resistive unfolded strip discharge member within the roll winding.

It is a further object of this invention to provide an improved capacitor assembly having a flat discharge resistor shunt strip member positioned within the capacitor roll at the roll end.

It is another object of this invention to provide an improved discharge resistor shunt strip member interposed in a capacitor roll at the roll end and lying therein in a longitudinal manner to overlap the intermediate dielectric strip.

Briefly described, this invention in one of its preferred forms includes a discharge resistor in the form of an electrically conductive strip member of a predetermined resistance, such as for example, a carbon loaded paper strip which is inserted into a capacitor roll assembly at the end of the roll and just prior to removing the roll from a winding machine. At the roll end, one of the electrodes terminates short of the other electrode. The resistor strip engages the shorter electrode and lies longitudinally in the roll until it overlaps an exposed edge of a dielectric material strip and then engages the other electrode. The degree of resistance which is necessary is determined by the distance between the end of the first electrode and the exposed edge of the dielectric and therefore the dielectric strip length is programmed to provide the proper resistance.

BRIEF DESCRIPTION OF THE DRAWINGS

This invention will be better understood when taken in connection with the following description of the drawings in which:

FIG. 1 is an illustration of a section of a roll capacitor strip having a dielectric material between two electrodes and illustrating the discharge resistor of this invention interconnecting the electrodes.

FIG. 2 is an enlarged and partial illustration of the discharge resistor member of this invention at the capacitor roll end.

FIG. 3 is an enlarged and partial illustration of a modification of the invention as disclosed in FIG. 2.

FIG. 4 is an illustration of one preferred capacitor embodying this invention.

DESCRIPTION OF A PREFERRED EMBODIMENT

Referring now to FIG. 1 there is illustrated one preferred form of a capacitor roll section to which this invention is particularly applicable. In FIG. 1, roll section 10 comprises a roll or convolute made up of alternate paper strips 11, 12 and 13, and electrode foil strips 14 and 15. The capacitor roll section 10 is also provided with a pair of electrical leads 16 and 17 which make contact with the foil electrodes in the roll and extend from the roll. In the practice of this invention each of the dielectric strips may be replaced with one or more dielectric strips of the same or different material. The dielectric for these strips may be any of the various well-known capacitor materials such as paper and synthetic resins. At the same time the electrode foil strips 14 and 15 may be provided by means of metallized coating on appropriate dielectric strips.

The resistor strip 18 of this invention is disclosed as positioned at the roll end and lies adjacent foil electrode 14, overlaps an exposed edge of the intermediate dielectric 12 and makes contact with electrode 15. As illustrated, resistor strip 18 is positioned in the roll in a longitudinal manner with respect to the foil and dielectric strips. The details of the discharge resistor of this invention to the capacitor roll section of FIG. 1 are best illustrated with respect to FIG. 2.

Referring now to FIG. 2, the first electrode strip 14 is shown as terminating in the roll at a significant distance from the roll end of the inner paper dielectric strip 11. The resistor strip 18 preferably underlies first electrode strip 14 to be restrained between first electrode strip 14 and inner dielectric strip 11 to make good electrical contact with first electrode 14. However, in some instances it may overlie the first electrode. Thereafter, resistor strip 18 extends longitudinally in the roll a significant distance beyond the end of first electrode strip 14. Superimposed upon first electrode strip 14 is an intermediate dielectric strip 12, and the end of the intermediate dielectric strip 12 extends beyond the termination of the first electrode strip 14 but short of the termination of the discharge resistor strip 18. Thereafter the second electrode strip 15 of the capacitor, is superimposed upon the intermediate paper dielectric strip 12 so that the end of the resistor strip projects a significant distance beyond the end of the intermediate dielectric strip 12. In order to complete the capacitor assembly, a further or outer dielectric strip 13 is superimposed upon the second electrode strip 15 and the end of this outer paper dielectric strip which projects beyond the end of the second electrode strip 15 is not of significance.

As can be seen from the foregoing description when the roll 10 is flattened or wound, the portion of the resistor 18 which extends beyond the end of the intermediate dielectric strip 12 will come into contact with the second electrode strip 15. There is thus defined an electrical contact between the two electrode strips 14 and 15 through the discharge resistor strip 18. It is an important feature of this invention that the degree of the resistance required is controlled by the length of the intermediate dielectric strip 12 which extends beyond the end of the first electrode strip 14. In this embodiment, the resistor 18 bridges the foil strip and the intermediate dielectric strip 12 without piercing any of these strips.

The resistor 18 may be of a conductive material of suitable resistivity and predetermined cross section and width to provide a controlled voltage discharge, subject however to the variation of the length of the intermediate dielectric strip 12 from the end of the first electrode strip 14. Both metallic and non-metallic conductive materials may be employed for discharge resistor 18. Additionally, discharge resistor member 18 may be of non-conducting materials such as paper or polymeric materials which are made predeterminately conductive by means of the addition of a conductive material thereto whether in the manner of a coating such as a metallized coating on a substrate or by way of dispersing the conductive material in the strip. For example, a preferred resistor material which has been in the invention with excellent results is a thin flexible carbon loaded paper which is commercially available.

A modification of this invention is illustrated in FIG. 3. Referring now to FIG. 3, the use of an appropriate aperture 19 within the intermediate dielectric strip 12 provides a means of inserting the discharge resistor of this invention at a point in the capacitor roll section further removed from the roll end. The aperture 19 may be a suitable sized opening within the dielectric strip 12 or it may, in fact, be a complete separation in intermediate dielectric strip 12. In either event, when the roll 10 is compacted the second electrode 15 will come into contact with the resistor 18 through the aperture 19 and therefore the distance that the aperture edge 20 extends or is spaced longitudinally beyond the end of the first electrode strip 14 controls the degree of electrical resistance interposed between the two electrode strips 14 and 15. In this embodiment, the resistor 18 effectively bridges the aperture 19 and does not have an end projecting into the opening.

The above described invention is particularly applicable to high speed production and high speed winding machines. In the FIG. 2 embodiment, it provides for an almost complete winding of the capacitor roll before the resistor 18 is inserted. Instead of being required to use discharge resistor strips of varying sizes to provide varying degrees of resistivity for different rolls, a mere programming of the winding machine to terminate the first foil and the intermediate dielectric strip 12 at the proper time and position is all that is necessary to provide the required resistance in the circuit. At the same time, this invention provides that the resistor strip 18 is completely isolated within the roll and no part of the resistor 18 is exposed either from the roll ends or from the roll edges. There is consequently no danger of the discharge resistor coming in contact with the case and no further insulation is necessary. This type of non-exposure of a resistor is sometimes referred to as a buried resistor. The buried resistor of this invention is applicable to various roll configurations or sizes for different capacitors. The degree of resistance necessary is merely programmed as a length of a dielectric strip and therefore only one supply and one size of discharge resistor strip 18 is required.

This invention thus provides a buried type discharge resistor which may be buried within a capacitor roll so that there are no protruding portions from the roll section. More importantly, there are no folded sections required to make the electrical contact. Folded sections may create electrical problems. The resistor 18 of this invention is relatively a flat section in the capacitor and in the FIG. 2 form requires no windows, apertures or other working of the foils or dielectric. In the roll end, the resistor has the important working advantage of being able to dissipate heat generated thereby to the adjacent case wall. Further, the effective resistance length of the resistor 18 is that flat length of resistor 18 between the end of the first foil 14 and the end of the intermediate dielectric strip 12. The actual length of the resistor 18 from this latter point to the contact with the second foil 15 is insignificant.

FIG. 4 illustrates an exemplary capacitor type 21 which utilizes the present invention with good advantage. In FIG. 4 capacitor 21 is referred to as a ballast capacitor and may have a rating from about 1.5 microfarads at 700 volts to about 4.0 microfarads at about 330 volts. Typically, capacitor 21 may be on the order of about 1.0 inch thick, 2.0 inches wide, and 2.5 inches high as an overall case size. A resistor strip 18 as utilized in the foregoing capacitor may be approximately 0.75 inches in active length and 0.25 inches in width and comprises a carbon loaded paper of 0.75 to 5.0 mil thickness and about 1.5 megohms of resistivity per square. The foregoing capacitor is impregnated with an Aroclor or Pyranol impregnant which is usually a chlorinated diphenyl. Excellent results have been obtained from the usage of the discharge resistor 18 even when buried in this liquid environment.

While the present invention has been described with reference to particular embodiments thereof it will be understood that numerous modifications may be made by those skilled in the art without actually departing from the scope of this invention. Therefore, the appended claims are intended to cover all such equivalent variations as come within the true spirit and scope of the invention.

What is claimed as new and desired to be secured by Letters Patent of the United States is:

1. A capacitor having a buried resistor in a capacitor roll section comprising in combination a. a roll section of alternate dielectric and electrode strips wound in roll form
b. said roll section having a first one of its electrode strips of a longitudinal length less than that of the other second electrode strip to provide a staggered relationship of foil strip ends at one end of said roll
c. an intermediate dielectric strip between said electrodes and having an exposed edge between and longitudinally spaced from the ends of both of said electrode strips
d. a discharge resistor strip bridging said exposed edge of said intermediate dielectric strip to engage each of said electrodes.

2. The invention as recited in claim 1 wherein said exposed edge represents an aperture in said intermediate dielectric strip.

3. The invention as recited in claim 2 wherein said resistor strip bridges said aperture.

4. The invention as recited in claim 1 wherein said exposed edge is the termination of said intermediate dielectric strip.

5. The invention as recited in claim 1 wherein said exposed edge is a dividing split in said intermediate dielectric strip.

6. The invention as claimed in claim 5 wherein said resistor strip bridges said split.

7. The invention as recited in claim 1 wherein the required resistivity of said resistor is predetermined by the resistor distance between said exposed edge and the termination of said first electrode strip.

8. The invention as recited in claim 7 wherein said resistor is a carbon loaded paper strip.

9. The invention as recited in claim 7 wherein said resistor is a polymer strip of controlled resistivity.

10. The invention as recited in claim 7 wherein said resistor is a flexible non-conductive substrate with a thin metal film thereon.

* * * * *